H. B. JOHNSTON.
PISTON AND PISTON RING.
APPLICATION FILED APR. 5, 1920.

1,418,802.

Patented June 6, 1922.

Inventor
Harry B. Johnston
By Walter W Burns
Attorney

UNITED STATES PATENT OFFICE.

HARRY B. JOHNSTON, OF SEATTLE, WASHINGTON.

PISTON AND PISTON RING.

1,418,802.  Specification of Letters Patent.  Patented June 6, 1922.

Application filed April 5, 1920. Serial No. 371,553.

*To all whom it may concern:*

Be it known that I, HARRY B. JOHNSTON, a citizen of the United States, residing at Seattle, in the county of King and State of Washington, have invented certain new and useful Improvements in Pistons and Piston Rings, of which the following is a specification.

This invention relates to pistons and piston rings and is adapted for use in machines where it is desirable to prevent the passage of a fluid between the walls of a cylinder and piston.

The object of this invention is the provision of a piston and ring construction wherein a split piston ring having an inclined surface is mounted in a groove having an inclined wall and having the portion on the side of the ring toward the working pressure cut away to permit the fluid pressure to force the ring along the inclined wall of the groove and against the cylinder wall.

Referring to the drawings which illustrate preferred embodiments of my invention, Figure 1 illustrates a cross section of an embodiment of my invention applied at both the top and bottom of the piston.

The reference characters refer to similar parts throughout the several views.

Figure 1:
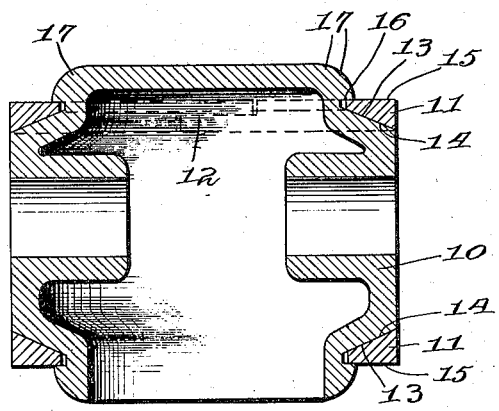
Figure 2:
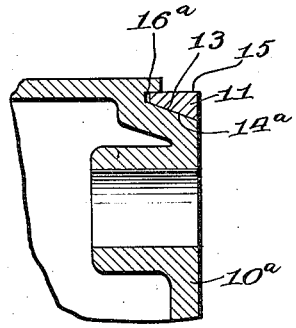
Figures 2 to 4 illustrate modifications of the cut away portion shown in Figure 1.
Figure 3:
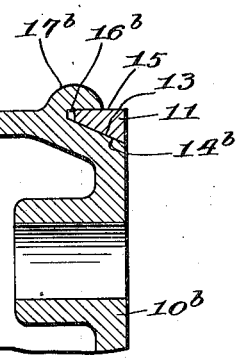
Figure 4:
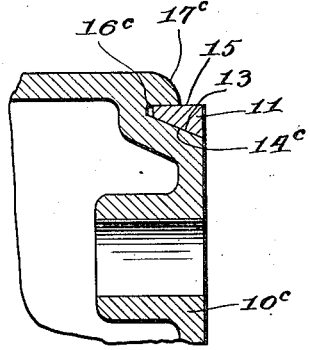

10, $10^a$, $10^b$, $10^c$, $10^d$ represent the piston and the modifications thereof. 11 designates the split piston ring having a split 12 indicated on Figure 1.

The side of the piston ring farthest from the working face of the piston is provided with an inclined face 13 which cooperates and contacts with an inclined wall in the groove and which is designated in the respective figures as 14, $14^a$, $14^b$, $14^c$, $14^d$. The face of the ring toward the working surface is preferably a plane surface as 15 although this is not necessary for the perfect action.

Figure 5:
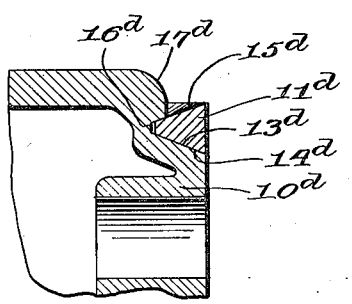
Figure 5 illustrates a piston with a modified ring construction.

In Figure 5 is illustrated a modified ring $11^d$ having an upper face $15^d$ of conical form instead of a plane surface.

At the rear of each ring is a space which I have designated at 16, $16^a$, $16^b$, $16^c$, $16^d$ respectively in the several grooves.

The piston is cut away at the periphery and on the side of the ring toward the working surface. The exact point to which the piston is cut away is not essential; the edge however is preferably rounded off as shown in Figures 1, 3, 4 and 5, at 17, $17^b$, $17^c$, $17^d$, respectively.

In operation the pressure on one side of the piston comes in direct contact with the ring and forces it to expand and slide along the inclined wall of the groove, thus bringing the outer cylindrical wall of the ring against the wall of the cylinder. It is clear from this description that the operation of my piston and ring does not depend entirely upon the expansive force of the ring since the greater the force of the fluid on the ring, the greater will be the tendency to prevent the passage of the gas between the ring and cylinder wall. Attention is also directed to the fact that in my preferred form of ring the axial thickness is less than the radial thickness.

While I have stated that it is not necessary to have the upper face of the ring in a plane, it is essential to have no substantial portion, particularly that portion adjacent the cylinder wall, make an angle with the inclined wall which is greater than a right angle. For instance, if in Figure 5, the angle between the inclined wall $14^d$ and the upper surface $15^d$ were greater than 90°, there would be a tendency to force the edge of the ring, nearest the pressure side of the piston, against the wall of the cylinder with greater force than the other portions. This would cause unequal wear on the different parts of the ring.

In Figure 1 is shown a piston and two rings which when applied to an internal combustion motor operates as follows:—As the explosion takes place the upper ring is expanded against the piston wall, thus making a tight seal. During the working stroke the lower ring is slack, thus permitting the oil to come up between the piston and cylinder. The lower edge of the upper ring 11 however cuts away and forces downwardly all oil except a very thin film which is necessary for proper lubrication. During the next downward stroke, which is the intake stroke, the upper ring is inactive and the difference in pressure between the crank chamber and combustion chamber causes the lower ring 11 to expand and cause a tight seal, thus taking in more of the mixture. The next upward stroke which is the compression stroke again brings into action the upper ring as described. Thus, since a tight seal is maintained during suction and compression stroke, a higher compression at the time of explosion is obtained.

During the expansion stroke of an internal combustion motor great pressure is brought on one side of the cylinder by the piston due to the crank changing the inclination of the connecting rod. This results in the cylinder being worn out of round. This wearing action begins at the middle of the side of the cylinder due to the fact that the piston is always necessarily made slightly smaller than the cylinder. In my construction there is a tendency of the piston ring by its action on the inclined wall of the groove, to hold the piston in the center of the cylinder and away from the walls thereof. This action in tending to hold the piston in the middle of the cylinder is caused by the coaction between the two cones, one being the wall 14 of the groove, and the other the inclined surface 13 of the ring. Since the ring is expanded in all directions against the wall of the cylinder, the friction is distributed over the whole cylinder wall and there is not the tendency to wear away the cylinder wall as in the case of the ordinary piston which contacts with the cylinder wall at only one line.

By permitting the pressure to operate directly upon the ring and by having a construction in which a greater pressure makes a tighter seal, all of the pressure is retained from the beginning of the stroke and the friction is reduced, due to the fact that the tight ring pressure is only maintaining when it is necessary to prevent the escape of the fluid under the high pressure.

While I have shown and described several modifications of my invention, I desire to have it understood that these are merely exemplary and that modifications and changes may be made without departing from the spirit of my invention and within the scope of the appended claims.

Having described my invention what I claim is:

1. In combination a piston having a ring groove and a cylinder bearing portion, the ring groove having a wall inclined outwardly and away from the working face of the piston, a relatively fixed wall on the side of the groove toward the working face and having a substantial portion cut away between the working face and the groove and inward of the cylinder bearing portion of the piston to expose the surface of the ring opposite the inclined surface, to the fluid pressure at the end of the piston, a resilient piston ring in the groove, the ring having an inclined surface cooperating with the inclined wall of the groove, the surface opposite the inclined surface of the ring being outwardly divergent with relation thereto throughout the greater part of the radial thickness of the ring but having an inclination to the inclined surface of the ring not greater than 90°, the cylinder bearing portion of the piston having its outer edges at a greater distance apart than the axial width of the cylinder bearing portion of the ring.

2. In combination a piston having a ring groove and a cylinder bearing portion, the ring groove having a wall inclined outwardly and away from the working face of the piston, a relatively fixed wall on the side of the groove toward the working face and having a substantial portion cut away between the working face and the groove and inward of the cylinder bearing portion of the piston to expose the surface of the ring opposite the inclined surface to the fluid pressure at the end of the piston, a resilient piston ring in the groove, the ring having an inclined surface cooperating with the inclined wall of the groove, the surface opposite the inclined surface of the ring being outwardly divergent with relation thereto and lying substantially in a plane, the cylinder bearing portion having its outer edges at a greater distance apart than the axial width of the cylinder bearing portion of the ring.

3. In combination, a piston having a groove adjacent one end thereof, said groove having a wall inclined outwardly and away from the working face of the piston, a wall on the side of the groove toward the working face and having a substantial portion cut away between the working face and the groove and inward of the periphery of the piston to expose the surface of the ring opposite the inclined surface to the fluid pressure at the end of the piston, a piston ring in the groove, the ring having a greater radial thickness than the width of the cylinder bearing surface and having an inclined surface cooperating with the inclined wall of the groove, the opposite surface of the ring having a substantial portion of its surface outwardly divergent relative to the inclined surface of the ring.

4. In combination, a piston having a groove adjacent one end thereof, said groove having a wall inclined outwardly and away from the working face of the piston, a wall on the side of the groove toward the working surface and having a substantial portion cut away between the working face and the groove and inward of the periphery of the piston to expose the surface of the ring opposite the inclined surface to the fluid pressure at the end of the piston, a resilient piston ring in the groove, the ring having a greater radial thickness than the width of the cylinder bearing surface, and having an inclined surface cooperating with the inclined wall of the groove, the opposite surface of the ring lying substantially in a plane.

5. In combination, a piston having a ring groove and a cylinder bearing portion, the ring groove having a wall inclined outwardly and away from the working face of the piston, a relatively fixed wall on the side of the groove toward the working face and having a substantial portion cut away between the working face and the groove and inward of the cylinder bearing portion of the piston, to expose the surface of the ring opposite the inclined surface to the fluid pressure at the end of the piston, a one piece piston ring in the groove, the ring having an inclined surface cooperating with the inclined wall of the groove, a substantial part of the ring surface opposite the inclined surface being outwardly divergent with relation thereto but having an inclination to the inclined surface not greater than 90°, the cylinder bearing portion of the piston having its outer edges at a greater distance apart than the axial width of the cylinder bearing portion of the ring.

6. In combination, a piston having a ring groove and a cylinder bearing portion, the ring groove having a wall inclined outwardly and away from the working face of the piston, a resilient piston ring in the groove, the piston having a relatively fixed extension opposite the inclined wall to hold the ring in the groove but leaving a substantial portion of the ring exposed to the pressure at the end of the piston, the ring having an inclined surface cooperating with the inclined wall of the groove, the surface opposite the inclined surface being outwardly divergent with relation thereto but having an inclination to the inclined surface not greater than 90° and being so constructed relative to the wall opposite the inclined wall that substantially all of its surface is exposed to the pressure at the end of the piston when the ring is not contracted within the groove, the cylinder bearing portion of the piston having its outer edges at a greater distance apart than the axial width of the cylinder bearing portion of the ring.

7. A hollow one piece internal combustion engine piston having an open end, a piston ring groove adjacent each end, each groove having an inclined wall inclining outwardly and in the direction of the other groove, and an extension over part of the groove adjacent the respective piston ends and leaving the other part of the groove accessible to the pressure at the end of the piston.

In testimony whereof I affix my signature.

HARRY B. JOHNSTON.